United States Patent
Do Nascimento et al.

(10) Patent No.: US 10,315,705 B2
(45) Date of Patent: Jun. 11, 2019

(54) SYSTEM FOR SLIDABLY MOUNTING AND SELF-CENTERING A HOOD

(71) Applicant: RENAULT s.a.s., Boulogne Billancourt (FR)

(72) Inventors: Silvino Do Nascimento, Bois D'Arcy (FR); Philippe Perreux, L'Etang la Ville (FR); Patrick Perot, Voisins le Bretonneux (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 15/515,196

(22) PCT Filed: Sep. 8, 2015

(86) PCT No.: PCT/FR2015/052377
§ 371 (c)(1),
(2) Date: Mar. 29, 2017

(87) PCT Pub. No.: WO2016/051036
PCT Pub. Date: Apr. 7, 2016

(65) Prior Publication Data
US 2018/0229775 A1 Aug. 16, 2018

(30) Foreign Application Priority Data
Sep. 30, 2014 (FR) ...................................... 14 59262

(51) Int. Cl.
*B62D 25/12* (2006.01)
*B62D 65/06* (2006.01)

(52) U.S. Cl.
CPC ............. *B62D 25/12* (2013.01); *B62D 65/06* (2013.01)

(58) Field of Classification Search
CPC ................................ B62D 65/06; B62D 25/12
See application file for complete search history.

(56) References Cited

U.S. PATENT DOCUMENTS 3,767,001 A * 10/1973 Chupick ................ B62D 25/12
16/291

FOREIGN PATENT DOCUMENTS

DE      19718594 A1    11/1998
FR      2986766 A1     8/2013

OTHER PUBLICATIONS

FR2986766A1 Computer translation from Espacenet.*
(Continued)

*Primary Examiner* — D Glenn Dayoan
*Assistant Examiner* — Melissa A Black
(74) *Attorney, Agent, or Firm* — Oblon, McClelland, Maier & Neustadt L.L.P.

(57) ABSTRACT

A system that mounts a motor vehicle hood on a body of the vehicle includes a guide element to slidably guide the hood relative to the body in a longitudinal direction of the vehicle and a locking element to lock the hood to immobilize the hood relative to the body in a closed position, in which it seals off an engine compartment. The locking element assumes an activated state as a result of a sliding movement of the hood relative to the body in the longitudinal direction of the vehicle in a first direction. The guide element includes a self-centering element to self-center the hood relative to the body in a direction transverse to the vehicle while the hood slides in the first direction, and ensures that the closed position of the hood is a predetermined position in the transverse direction and is constant relative to the body.

17 Claims, 3 Drawing Sheets

(56) References Cited

OTHER PUBLICATIONS

International Search Report dated Dec. 2, 2015, in PCT/FR2015/052377, filed Sep. 8, 2015.
French Search Report dated May 18, 2015, in FR 1459262, filed Sep. 30, 2014.

* cited by examiner

SYSTEM FOR SLIDABLY MOUNTING AND SELF-CENTERING A HOOD

TECHNICAL FIELD OF THE INVENTION

The invention relates to a system for mounting a motor vehicle hood on the body of the vehicle, comprising an element for slidably guiding the hood relative to the body in a longitudinal direction of the vehicle, an element for locking the hood immobilizing the hood relative to the body in a closed position, in which it seals off an engine compartment, the locking element assuming an activated state as a result of a sliding movement of the hood relative to the body in the longitudinal direction of the vehicle in a first direction.

The invention also has as its object a motor vehicle comprising a hood mounted on a body of the motor vehicle by means of a suchlike mounting system.

STATE OF THE ART

In the construction of a motor vehicle, it is generally necessary to mount and to position a very large number of functional elements, for example body panels such as a hood, relative to the body structure of the motor vehicle.

The fact that the hood is traditionally intended to assume an open position in which it closes the engine compartment of the vehicle requires a mounting of the hood by articulation, which may prove to be problematical for practical reasons or, more particularly, for reasons of cost. A suchlike mounting is obtained, for example, by the provision of a pivoting articulation between the hood and a component known as a "hood support" intended to support the hood when it is in the closed position. A suchlike hood support is itself attached to a structural element of the body. Document FR-A1-2844499, for example, describes a suchlike solution.

This type of hood support plays a part in the mounting and positioning of the hood, although its maintenance in the closed position (against an upward-directed opening movement) must be achieved by means of a supplementary locking element, which is offset relative to the hood support. This solution remains complicated, however, and relatively onerous in addition to the problems associated with the articulation movement.

It has also been envisaged to address these disadvantages by means of a system of mounting the hood on the body of the vehicle, comprising an element for locking the hood by assuming an activated state immobilizing the hood in the closed position by the implementation of a sliding movement of the hood relative to the body in a longitudinal direction of the vehicle in a first direction. The second direction permits the deactivation of the locking element. This solution is familiar from document FR2986766A1, for example, in the name of the applicant.

A further need exists, however, to find a system for mounting the hood which makes it possible to achieve the centering and the positioning of the hood regardless of the geometry of its environment, under difficult conditions of access. This is particularly problematical if the positioning accessories are non-visible.

OBJECT OF THE INVENTION

The object of the present invention is to propose a system for mounting a motor vehicle hood on a body of the vehicle which addresses the disadvantages described above.

This object may be accomplished by means of a system for mounting a motor vehicle hood on the body of the vehicle, comprising an element for slidably guiding the hood relative to the body in a longitudinal direction of the vehicle, an element for locking the hood immobilizing the hood relative to the body in a closed position, in which it seals off an engine compartment, the locking element assuming an activated state as a result of a sliding of the hood relative to the body in the longitudinal direction of the vehicle in a first direction, characterized in that the guide element comprises an element for self-centering the hood relative to the body in a direction transverse to the vehicle while the hood slides in the first direction, and ensuring that the closed position of the hood is a predetermined position in the transverse direction and is constant, more particularly centered, relative to the body.

According to one particular embodiment, the self-centering element ensures the fixing of the hood in position relative to the hood in the transverse direction when the hood assumes its closed position.

Preferably, the self-centering element is configured so as to be activated automatically by the sliding movement of the hood towards its closed position in the first direction.

According to another embodiment, the locking element assumes a deactivated state by a sliding movement of the hood in the longitudinal direction in a second direction opposite said first direction.

The system for mounting may comprise at least one lock capable of being actuated in rotation so as to vary between a locking configuration preventing the sliding movement of the hood in the second direction in the longitudinal direction and an unlocking configuration permitting the sliding movement of the hood in the first direction in the longitudinal direction.

The sliding movement of the hood in the first direction in the longitudinal direction is controlled by the passage of the lock from the unlocking configuration to the locking configuration.

The self-centering element may comprise a first component intended to be integral with the hood and a second component intended to be integral with the hood, the first component interacting with the second component by contact and sliding ensuring the transverse guiding of the first component relative to the second component during the movement involving sliding of the hood in the first direction in the longitudinal direction.

According to one embodiment, one of the first and second components, more particularly the second component, is constituted by a tenon, and the other of the first and second components, more particularly the first component, is constituted by a housing for automatically receiving the tenon during the sliding movement of the hood in the first direction in the longitudinal direction.

One at least of the first and second components, more particularly the tenon, may comprise an elastically deformable section configured in such a way as to deform elastically during the movement involving sliding of the hood in the first direction in the longitudinal direction, in a manner ensuring the self-centering of the hood through the transversal balancing of the relative position of the first and second components in the transverse direction.

The system for mounting may comprise abutment elements intended to be integral with the body and preventing the sliding movement of the hood in the longitudinal direction in the first direction when the hood assumes its closed position.

A motor vehicle may finally comprise a hood mounted on the motor vehicle by means of a suchlike mounting system.

BRIEF DESCRIPTION OF THE DRAWINGS

Other advantages and characterizing features will emerge more clearly from the following description of particular embodiments of the invention that are given by way of non-restrictive examples and are illustrated in the accompanying drawings, in which.

DESCRIPTION OF PREFERRED EMBODIMENTS OF THE INVENTION

The description is made with reference to an autonomous benchmark (X, Y, Z) traditionally associated with a motor vehicle, in which X is the front-rear longitudinal direction of the vehicle facing towards the rear, Y is the right-left direction transverse to the vehicle, which is horizontal and perpendicular to X, facing towards the right, and Z is the vertical direction facing towards the top.

Figure 1:
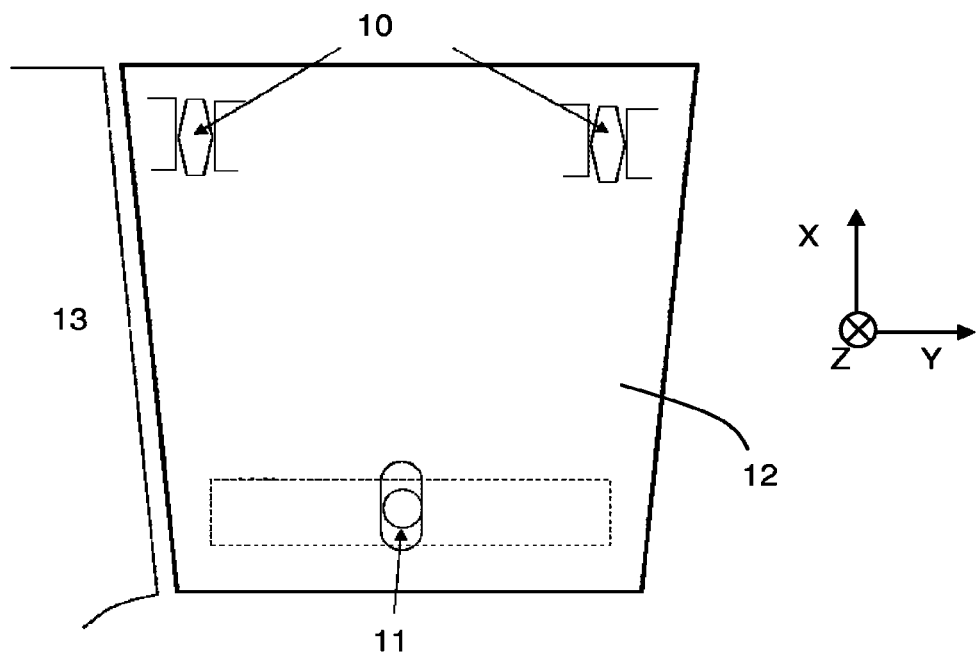
FIGS. 1 and 2 are schematic views from below of a hood mounted by means of an example of a mounting system according to the invention.
Figure 2:
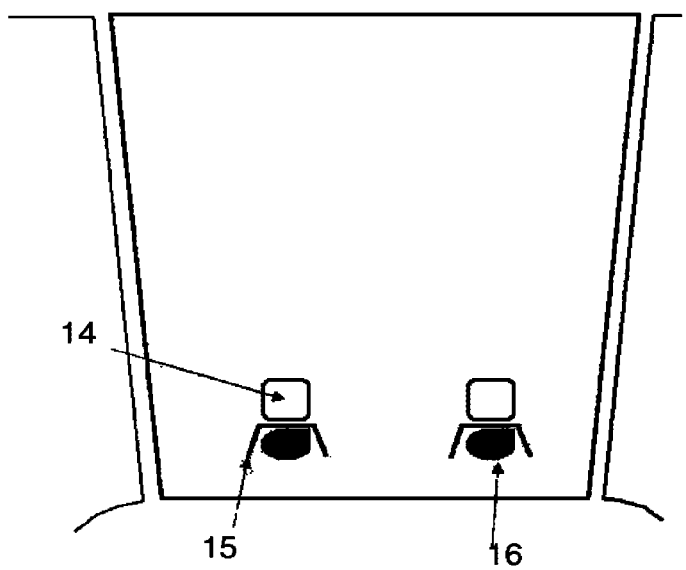
Figure 3:
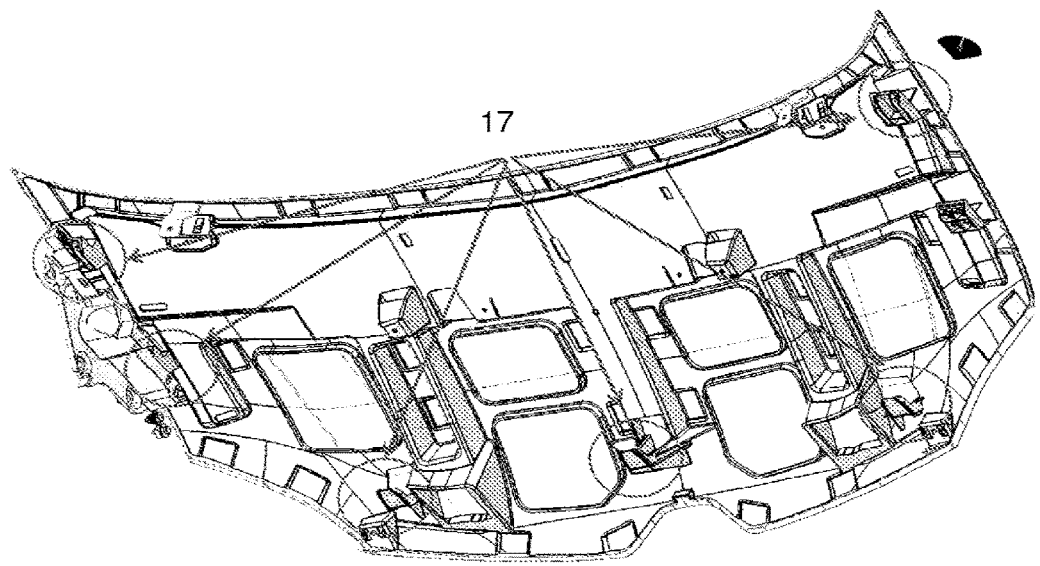
FIG. 3 is a perspective view from below of the hood utilized with the mounting system.

The invention described below with reference to the accompanying FIGS. 1 to 5 essentially relates to a system for mounting a motor vehicle hood 12 on a body of the vehicle comprising an element 10, 11 for slidably guiding the hood 12 relative to the body in the longitudinal direction X. It also comprises an element for locking the hood, thereby immobilizing the hood 12 relative to the body in a closed position, in which it seals off an engine compartment. The locking element assumes an activated state as a result of the implementation of a sliding movement of the hood 12 relative to the body in the longitudinal direction X of the vehicle in a first direction, facing towards the top in FIGS. 1 and 2, that is to say facing towards the rear of the vehicle. A fender 13 of the vehicle is represented in FIGS. 1 and 2. The element 11 is a centering pin that is integral with the body, situated in the front section of the hood 12 and sliding in an elongated oblong hole in the longitudinal direction X provided in the hood 12. An inverted arrangement of the centering pin and the oblong hole may be provided.

The locking element comprises elements enabling the hood 12 to be maintained facing vertically towards the top in the vertical direction Z when the hood 12 assumes its closed position, and elements identified with 17 enabling the hood 12 to be maintained facing vertically towards the top in the vertical direction Z when the hood 12 assumes its closed position.

The invention also relates to a motor vehicle comprising the hood 12 mounted on a body of the motor vehicle by means of a suchlike mounting system.

According to one important characterizing feature, the sliding guiding element comprises an element for self-centering the hood 12 relative to the body in a direction Y transverse to the vehicle during sliding of the hood 12 in the first direction and ensuring that the closed position of the hood 12 is a constant predetermined position in the transverse direction Y relative to the body, more particularly a centered position in the direction Y transverse to the vehicle. In other words, the predetermined closed position assumed by the hood 12 is always identical, making the execution reliable and recurrent. Centering and the positioning of the hood 12 is possible regardless of the geometry of its environment, even under difficult conditions of access. This is particularly advantageous if the positioning accessories are non-visible, being concealed by the hood 12 and the fenders 13.

In a particular embodiment that is highly advantageous for the reliability of the positioning of the hood 12, the self-centering element ensures the fixing in place of the hood 12 relative to the body in the transverse direction Y when the hood 12 assumes its closed position. Thus, the self-centering element guarantees the transverse maintenance of the hood 12 when it assumes its closed position.

Preferably, the self-centering element is configured in such a way as to be activated automatically by the sliding movement of the hood 12 towards its closed position in the first direction. In such an embodiment, solely the implementation of the sliding movement of the hood in the longitudinal direction X in the first direction is sufficient to render the self-centering element operative without the need for another specific operation on the part of the person operating the hood 12.

According to a particular embodiment, the locking element instead assumes a deactivated state by the implementation of a sliding movement of the hood 12 in the longitudinal direction X in a second direction opposite said first direction. The second direction is directed downwards in FIGS. 1 and 2, that is to say it is oriented towards the front of the vehicle in the longitudinal direction X.

The self-centering element preferentially comprises, as illustrated, a first component intended to be integral with the hood 12 and a second component intended to be integral with the hood, the first component being configured to interact automatically with the second component by contact and by sliding in a manner ensuring the transverse guiding of the first component relative to the second component during the movement involving sliding of the hood 12 in the first direction in the longitudinal direction X.

The number of pairs each formed by a first component and a second component may vary depending on the needs, the costs, the precision, the resistance, etc. By way of example and as illustrated, a first component may be provided on the right, viewed in the transverse direction Y, and another first component may be provided on the left, also viewed in the transverse direction Y. Each of these two first components each interacts with a second component associated therewith.

Figure 4:
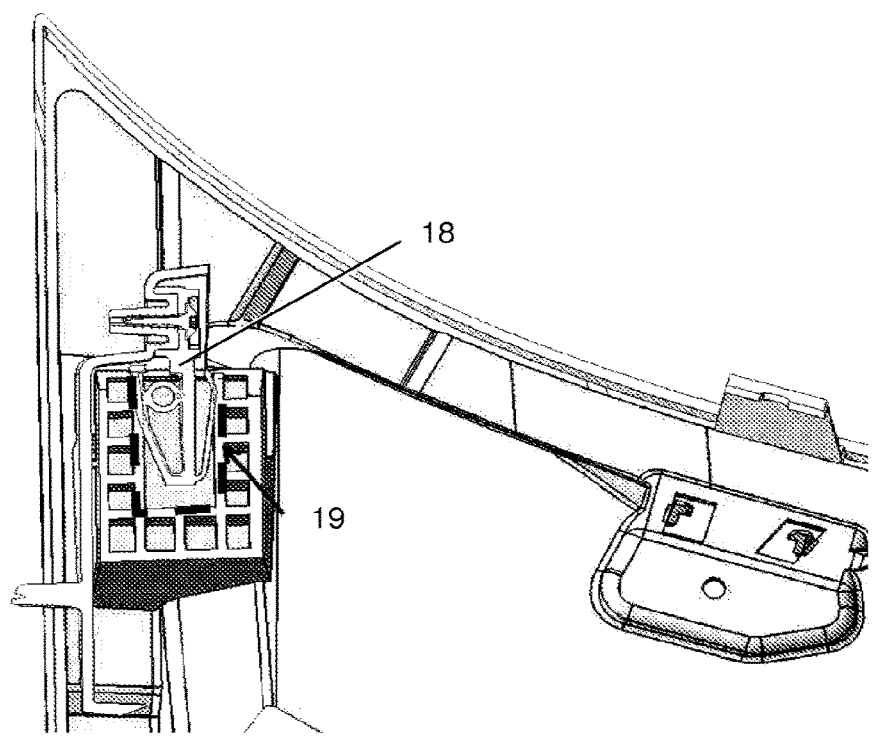
FIG. 4 is a detailed view from below the hood.
Figure 5:
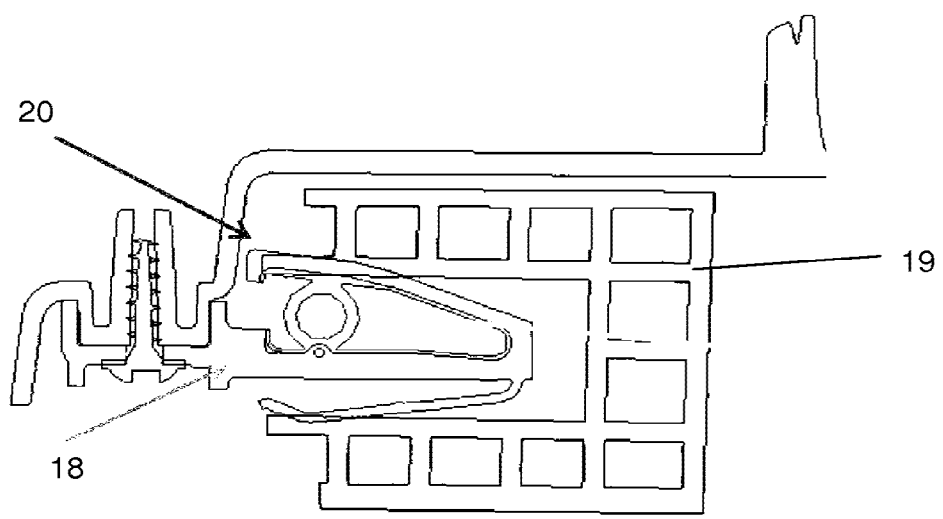
FIG. 5 represents the interaction between first and second components of the self-centering element.

Advantageously, for reasons of simplicity and cost, while conferring all the expected precision, provision may be made for one of the first and second components, more particularly the second component, to be constituted by a tenon 18, and for the other of the first and second components, more particularly the first component, to be constituted by a housing 19 for receiving the tenon 18 automatically during the movement involving sliding of the hood 12 in the first direction in the longitudinal direction X (FIGS. 4 and 5).

Preferentially, at least one of the first and second components, more particularly the tenon, comprises at least one elastically deformable section 20, for example in the form of a flexible flange, configured in such a way as to deform elastically during the movement involving sliding of the hood 12 in the first direction in the longitudinal direction X, thereby ensuring the self-centering of the hood 12 through the transverse balancing of the relative position of the first and second components in the transverse direction Y. This balancing is obtained directly by the restoring force taken in the transverse direction Y due to the natural elastic restoring action of each component 20 when it assumes an elastically deformed state.

By way of example corresponding to the needs specified above, the material used for the components 18, 19 may be polyamide or a polyoxymethylene-based thermoplastic material.

The system of mounting may comprise abutment elements 14 (FIG. 2) intended to be integral with the body and preventing the movement involving sliding of the hood 12 in the longitudinal direction X in the first direction when the hood 12 assumes its closed position.

Still with reference to FIG. 2, the system of mounting may comprise at least one lock 16 that is capable of being actuated in rotation so as to vary between a locking configuration preventing the sliding movement of the hood 12 in the second direction in the longitudinal direction X and an unlocking configuration permitting the sliding movement of the hood 12 in the first direction in the longitudinal direction X. Each lock 16 may be arranged in a housing 15 provided in the hood 12 (FIG. 2).

According to one particular embodiment, exhibiting the advantage of its ease of implementation, the movement involving sliding of the hood 12 in the first direction in the longitudinal direction X is controlled by the transition of the lock 16 from the unlocking configuration to the locking configuration.

The previously described solution permits effective centering and simple mounting while preserving the appearance and the aesthetics and without being visible when the hood 12 assumes its closed position.

The invention claimed is:

1. A system for mounting a motor vehicle hood on a body of the vehicle, comprising:
   a guide element to slidably guide the hood relative to the body in a longitudinal direction of the vehicle;
   a locking element to lock the hood to immobilize the hood relative to the body in a closed position, in which the hood seals off an engine compartment, the locking element assuming an activated state as a result of a sliding movement of the hood relative to the body in the longitudinal direction of the vehicle in a first direction; and
   at least one lock capable of being actuated in rotation so as to vary between a locking configuration preventing the sliding movement of the hood in the second direction in the longitudinal direction and an unlocking configuration permitting the sliding movement of the hood in the first direction in the longitudinal direction,
   wherein the guide element comprises a self-centering element to self-center the hood relative to the body in a direction transverse to the vehicle while the hood slides in the first direction, and ensures that the closed position of the hood is a predetermined position in the transverse direction and is constant relative to the body, and
   wherein the locking element assumes a deactivated state by a sliding movement of the hood in the longitudinal direction in a second direction opposite said first direction.

2. The system for mounting as claimed in claim 1, wherein the self-centering element ensures that the closed position of the hood is centered relative to the body.

3. The system for mounting as claimed in claim 1, wherein the self-centering element ensures the fixing of the hood relative to the body in the transverse direction when the hood assumes the closed position.

4. The system for mounting as claimed in claim 1, wherein the self-centering element is configured so as to be activated automatically by the sliding movement of the hood towards the closed position in the first direction.

5. The system for mounting as claimed in claim 1, wherein the sliding movement of the hood in the first direction in the longitudinal direction is controlled by the passage of the lock from the unlocking configuration to the locking configuration.

6. The system for mounting as claimed in claim 1, wherein the self-centering element comprises a first component configured to be integral with the hood and a second component configured to be integral with the body, the first component interacting with the second component by contact and sliding ensuring the transverse guiding of the first component relative to the second component during the movement involving sliding of the hood in the first direction in the longitudinal direction.

7. The system for mounting as claimed in claim 6, wherein one of the first and second components is constituted by a tenon, and the other of the first and second components is constituted by a housing for automatically receiving the tenon during the sliding movement of the hood in the first direction in the longitudinal direction.

8. The system for mounting as claimed in claim 7, wherein, more particularly the second component is the tenon and the first component is the housing.

9. The system for mounting as claimed in claim 6, wherein at least one of the first and second components comprises an elastically deformable section configured in such a way as to deform elastically during the movement involving sliding of the hood in the first direction in the longitudinal direction, in a manner ensuring the self-centering of the hood through the transverse balancing of the relative position of the first and second components in the transverse direction.

10. The system for mounting as claimed in claim 9, wherein a tenon comprises the elastically deformable section.

11. The system for mounting as claimed in claim 1, further comprising:
   abutment elements configured to be integral with the body and preventing the sliding movement of the hood in the longitudinal direction in the first direction when the hood assumes the closed position.

12. A motor vehicle comprising:
   a hood mounted on the motor vehicle by means of the system for mounting as claimed in claim 1.

13. A system for mounting a motor vehicle hood on a body of the vehicle, comprising:
   a guide element to slidably guide the hood relative to the body in a longitudinal direction of the vehicle;
   a locking element to lock the hood to immobilize the hood relative to the body in a closed position, in which the hood seals off an engine compartment, the locking element assuming an activated state as a result of a sliding movement of the hood relative to the body in the longitudinal direction of the vehicle in a first direction,
   wherein the guide element comprises a self-centering element to self-center the hood relative to the body in a direction transverse to the vehicle while the hood slides in the first direction, and ensures that the closed position of the hood is a predetermined position in the transverse direction and is constant relative to the body, and wherein the self-centering element comprises a first component configured to be integral with the hood and a second component configured to be integral with the body, the first component interacting with the second component by contact and sliding ensuring the transverse guiding of the first component relative to the second component during the movement involving sliding of the hood in the first direction in the longitudinal direction.

14. The system for mounting as claimed in claim 13, wherein one of the first and second components is constituted by a tenon, and the other of the first and second components is constituted by a housing for automatically receiving the tenon during the sliding movement of the hood in the first direction in the longitudinal direction.

15. The system for mounting as claimed in claim 14, wherein, more particularly the second component is the tenon and the first component is the housing.

16. The system for mounting as claimed in claim 13, wherein at least one of the first and second components comprises an elastically deformable section configured in such a way as to deform elastically during the movement involving sliding of the hood in the first direction in the longitudinal direction, in a manner ensuring the self-centering of the hood through the transverse balancing of the relative position of the first and second components in the transverse direction.

17. The system for mounting as claimed in claim 16, wherein a tenon comprises the elastically deformable section.

\* \* \* \* \*